US008755061B2

(12) United States Patent
Saito

(10) Patent No.: US 8,755,061 B2
(45) Date of Patent: Jun. 17, 2014

(54) DISPLAY INPUT DEVICE AND DISPLAY METHOD HIGHLIGHTING CHARACTERS BASED UPON WORD DATA AND PREDICTION DATA AND IMAGE FORMING APPARATUS PROVIDED THEREWITH

(71) Applicant: Kyocera Mita Corporation, Osaka (JP)

(72) Inventor: Yasushi Saito, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 0 days.

(21) Appl. No.: 13/869,579

(22) Filed: Apr. 24, 2013

(65) Prior Publication Data
US 2013/0242347 A1 Sep. 19, 2013

Related U.S. Application Data

(62) Division of application No. 13/080,028, filed on Apr. 5, 2011, now Pat. No. 8,619,317.

(30) Foreign Application Priority Data

Apr. 6, 2010 (JP) ................................. 2010-087993

(51) Int. Cl.
*G06F 3/12* (2006.01)
(52) U.S. Cl.
USPC ......... 358/1.13; 358/1.15; 715/821; 715/860; 715/861; 399/81

(58) Field of Classification Search
USPC ............................ 358/1.1, 1.13, 1.18; 399/81
See application file for complete search history.

(56) References Cited

U.S. PATENT DOCUMENTS

| 5,917,436 | A | * | 6/1999 | Endo et al. ............... 340/995.14 |
| 6,201,894 | B1 | * | 3/2001 | Saito ............................. 382/176 |
| 2006/0265567 | A1 | * | 11/2006 | Ji ................................... 711/173 |

FOREIGN PATENT DOCUMENTS

| JP | 2000-089890 | 3/2000 |
| JP | 2006-195575 | 7/2006 |
| JP | 2009-020159 | 1/2009 |

* cited by examiner

*Primary Examiner* — Dennis Dicker
(74) *Attorney, Agent, or Firm* — Smith, Gambrell & Russell LLP

(57) ABSTRACT

A display input device 1 includes: a display part 11 displaying character string regions; an input part 12 accepting operation; a storage part 18 storing data including data for an image; and a display control part 10 controlling the display at the display part. The display control part 10 judges whether or not, of the character string regions, the adjacent character string regions include the same character string, and if they include the same character string, makes the display part highlight characters other than the same character string.

16 Claims, 10 Drawing Sheets

Fig.5

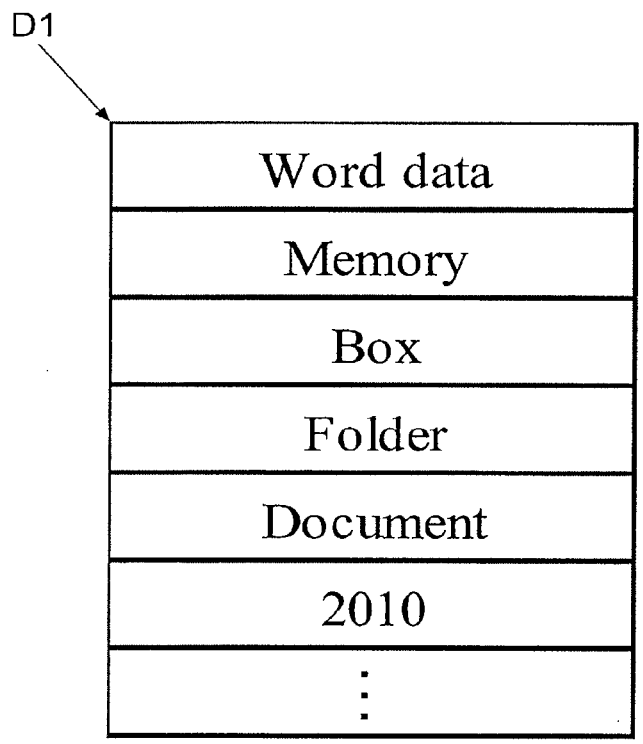

D1
- Word data
- Memory
- Box
- Folder
- Document
- 2010
- ⋮

| Condition | Target of highlighting |
|---|---|
| · Before any tab is pressed after written box screen is called | Each tab |
| · Auxiliary storage device is being fitted.<br>· Printing is performed by using data in auxiliary storage device | Remove key |
| · Auxiliary storage device is being fitted.<br>· Printing is performed by using data in auxiliary storage device | Memory Information key |
| ⋮ | ⋮ |

DISPLAY INPUT DEVICE AND DISPLAY METHOD HIGHLIGHTING CHARACTERS BASED UPON WORD DATA AND PREDICTION DATA AND IMAGE FORMING APPARATUS PROVIDED THEREWITH

CROSS REFERENCE TO RELATED APPLICATION

This application is a division of Ser. No. 13/080,028 filed Apr. 5, 2011, which is being incorporated in its entirety herein by reference.

This application is based on Japanese Patenet Application No. 2010-087993 filed on Apr. 6, 2010, the contents of which are hereby incorporated by reference.

BACKGROUND OF THE INVENTION

1. Field of the Invention

The present invention relates to a display input device provided with a display part such as a liquid crystal panel and an input part such as a touch panel, a display method of the display input device, and an image forming apparatus such as a copier, an MFP, a printer, or a fax machine, provided with the display input device.

2. Description of Related Art

For example, an image forming apparatus such as a copier or an MFP may be provided with a display input device for the purpose of performing inputting, for example, making a selection of and a setting for a function to be used. For example, the display input device is provided with: a display part of a touch panel type that displays a screen and input keys and buttons; various hard keys; etc. In the display input device, for example, the keys including the same character string may be displayed at the same time, causing erroneous pressing of the key or the like in some cases. Thus, known is the one that attempts to improve visibility upon displaying a list of a plurality of pieces of information.

Specifically, there is an information processor having: a comparison section for comparing, based on a preset comparison condition, reference information and comparison target information of a plurality of pieces of information composed of a character string; and a highlighting section for, based on a result of the comparison made by the comparison section, highlighting a part different between the reference information and the comparison target information to display a list of the plurality of pieces of information composed of a character string. This configuration makes it easy to discriminate an inconsistent section upon display of the list of the plurality of pieces of information.

With the information processor described above, the inconsistent part can be highlighted without fail. However, with this information processor, the inconsistent part is highlighted all the time. Thus, a large number of same or similar character strings within a screen results in a large number of highlighted parts. Therefore, the large number of highlighted parts relatively weakens highlighting effect, which contrarily raises a problem of difficulty in viewing.

Moreover, too many highlighted parts may have the user feel hard or annoying to see them. In other words, more highlighting than necessary is meaningless, and thus only a portion required by the user may be highlighted. Thus, the information processor described above may cause erroneous pressing of the key or the like as a result of the difficulty in viewing the screen of the display part, which leads to the problem of a possible feeling of annoyance.

SUMMARY OF THE INVENTION

It is an object of the present invention to, under presence of the same or similar character strings, without highlighting an inconsistent section all the time, perform highlighting only when it is admitted to be necessary, thereby keeping a state in which a screen of a display part is easy to view to thereby avoid erroneous key pressing by a user.

In order to achieve the object described above, a display input device according to one aspect of the invention includes: a display part displaying at least character string regions as regions including a character string; an input part accepting operation performed on the character string region; a storage part storing data including data for an image displayed at the display part; and a display control part controlling the display performed at the display part, judging whether or not, of the character string regions displayed at the display part, the adjacent character string regions include the same character string, and if the adjacent character string regions include the same character string, making the display part highlight characters other than the same character string.

With this configuration, highlighting is performed only in a case where false recognition or erroneous pressing by the user is likely to occur, for example, a case where, of character string regions such as keys or buttons, the adjacent character string regions include the same character string. Therefore, to avoid the erroneous pressing, etc., highlighting can be performed only for the character string region in great need of highlighting. Moreover, the erroneous pressing and false recognition by the user can effectively be avoided, thus resulting in no flood of highlighted sections in the screen of the display part.

Further features and advantages of the invention will be more clarified by the embodiment described below.

BRIEF DESCRIPTION OF THE DRAWINGS

FIG. 5 is an explanatory diagram showing one example of word data according to the embodiment;

FIG. 6 is an explanatory diagram showing one example of prediction data according to the embodiment;

DETAILED DESCRIPTION OF PREFERRED EMBODIMENTS

Hereinafter, an embodiment of the present invention will be described with reference to FIGS. 1 to 14. This embodiment will be described, referring to an MFP 100 (corresponding to an image forming apparatus) including an operation panel 1 (corresponding to a display input device) as an example. Note that elements including configuration, arrangement, etc. described in this embodiment do not limit the scope the invention and thus just serve as illustrative examples.

(Outline of MFP 100)

Figure 1:
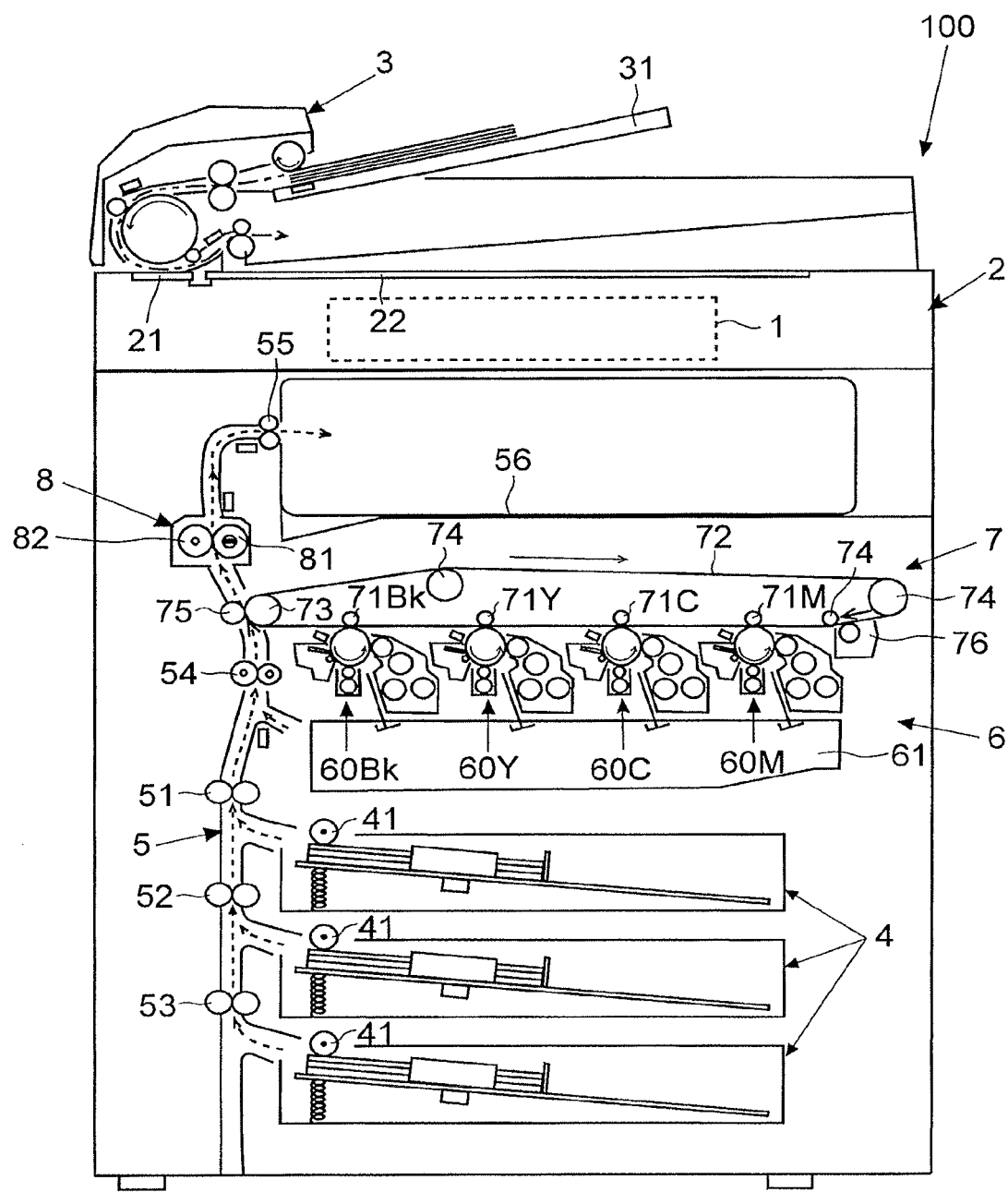
FIG. 1 is an elevation pattern cross section showing one example of an MFP according to an embodiment of the present invention.

First, an outline of the MFP 100 provided with the operation panel 1 according to the embodiment of the invention will be described with reference to FIG. 1. FIG. 1 is an elevation pattern cross section showing one example of the MFP 100 according to the embodiment of the invention.

First, as shown in FIG. 1, provided at the front in elevation view of the MFP 100 is an operation panel 1 as the display input device of the MFP 100 (illustrated by a broken line, details of which will be described below). The MFP 100 of this embodiment has an image reading part 2 and a document conveying device 3 provided at the top of the MFP 100. The MFP 100 also includes inside a main body thereof: paper feed parts 4; a conveying path 5; an image forming part 6; an intermediate transfer part 7; a fixing part 8; etc.

The document conveying device 3 has a document tray 31 where documents to be read are loaded. The document conveying device 3 automatically and consecutively conveys the documents one by one from the document tray 31 to a reading position (fed-document reading contact glass 21). The document conveying device 3 is fitted to the image reading part 2 in such a manner as to be openable and closable vertically with a far side of a paper surface of FIG. 1 as a support point, and functions as a cover that presses contact glasses (the fed-document reading contact glass 21 and a loaded-document reading contact glass 22) of the image reading part 2 from above.

Next, the image reading part 2, as shown in FIG. 1, includes at the top thereof: the fed-document reading contact glass 21; and the loaded-document reading contact glass 22 where documents such as a book are loaded to be read one by one. Arranged inside of the image reading part 2 are: a lamp, a mirror, a lens, an image sensor, etc. (not shown). The image sensor, based on light reflected on a document passing through the fed-document reading contact glass 21 or a document loaded on the loaded-document reading contact glass 22, reads the document. Then the image sensor converts the reflected light into an analog electrical signal in accordance with image density, then performs quantization, and as a result, obtains image data of the document. Note that the image reading part 2 of this embodiment can read both a color image and a black-and-white image.

The plurality of paper feed parts 4 in the main body of the MFP 100 respectively store a plurality of pieces of various kinds of paper (for example, copy paper, recycled paper, a cardboard, an OHP sheet, etc.) of different sizes (for example, A-type paper and B-type paper such as A4, B4, etc.). Each of the paper feed parts 4 includes a paper feed roller 41 driven into rotation and delivers the paper one by one to the conveying path 5 upon printing.

The conveying path 5 is a path for conveying the paper from the paper feed parts 4 to a discharge tray 56 via the image forming part 6 in the device. Provided at the conveying path 5 are: a guide plate for paper guidance; conveying roller pairs 51, 52, and 53 driven into rotation upon the paper conveyance; a registration roller pair 54 that puts the paper to be conveyed on standby before the image forming part 6 and then delivers the paper in synchronization with transfer of a formed toner image; etc.

The image forming part 6 includes: a plurality of image forming units 60 (60Bk for black, 60Y for yellow, 60C for cyan, and 60M for magenta) and an exposure device 61. The exposure device 61, based on, for example, the image data read at the image reading part 2 and image data stored in a storage device 92 to be described below, outputs laser light while turning it on and off to thereby subject each of photoconductive drums to scanning exposure. Each image forming unit 60 is provided with: the photoconductive drum supported in such a manner as to be capable of being driven into rotation; and a charging device, a developing device; a cleaning device, etc. which are disposed around the photoconductive drum. By each image forming unit 60 and the exposure device 61, a toner image is formed onto a circumferential surface of the corresponding photoconductive drum.

The intermediate transfer part 7, in response to primary transfer of the toner image from each image forming unit 60, performs secondary transfer on a sheet. The intermediate transfer part 7 is composed of: primary transfer rollers 71Bk to 71M; an intermediate transfer belt 72; a driving roller 73; a plurality of driven rollers 74; a secondary transfer roller 75; a belt cleaning device 76; etc. Each of the primary transfer rollers 71Bk to 71M sandwich the endless intermediate transfer belt 72 with the corresponding photoconductive drum. To each of the primary transfer rollers 71Bk to 71M, a transfer voltage is applied, whereby the toner images are transferred onto the intermediate transfer belt 72.

The intermediate transfer belt 72 is stretched over the driving roller 73, etc., and rounds by rotational driving of the driving roller 73 connected to a driving mechanism such as a motor (not shown). The driving roller 73 sandwiches the intermediate transfer belt 72 with the secondary transfer roller 75. The toner images (of the different colors including black, yellow, cyan, and magenta) respectively formed at the image forming units 60 are primarily transferred onto the intermediate transfer belt 72 in sequence while superposed on one another without any displacement and then transferred onto the sheet by the secondary transfer roller 75 to which a predetermined voltage has been applied.

The fixing part 8 fixes the toner images transferred onto the paper. The fixing part 8 is mainly composed of a heating roller 81 that has a built-in heater; and a pressure roller 82 making pressure-contact therewith. Upon passage of the paper through a nip between the heating roller 81 and the pressure roller 82, a toner melts and is heated, whereby the toner images are fixed onto the paper. The paper discharged from the fixing part 8 is discharged to the discharge tray 56 by a discharge roller pair 55.

(Operation Panel 1)

Figure 2:
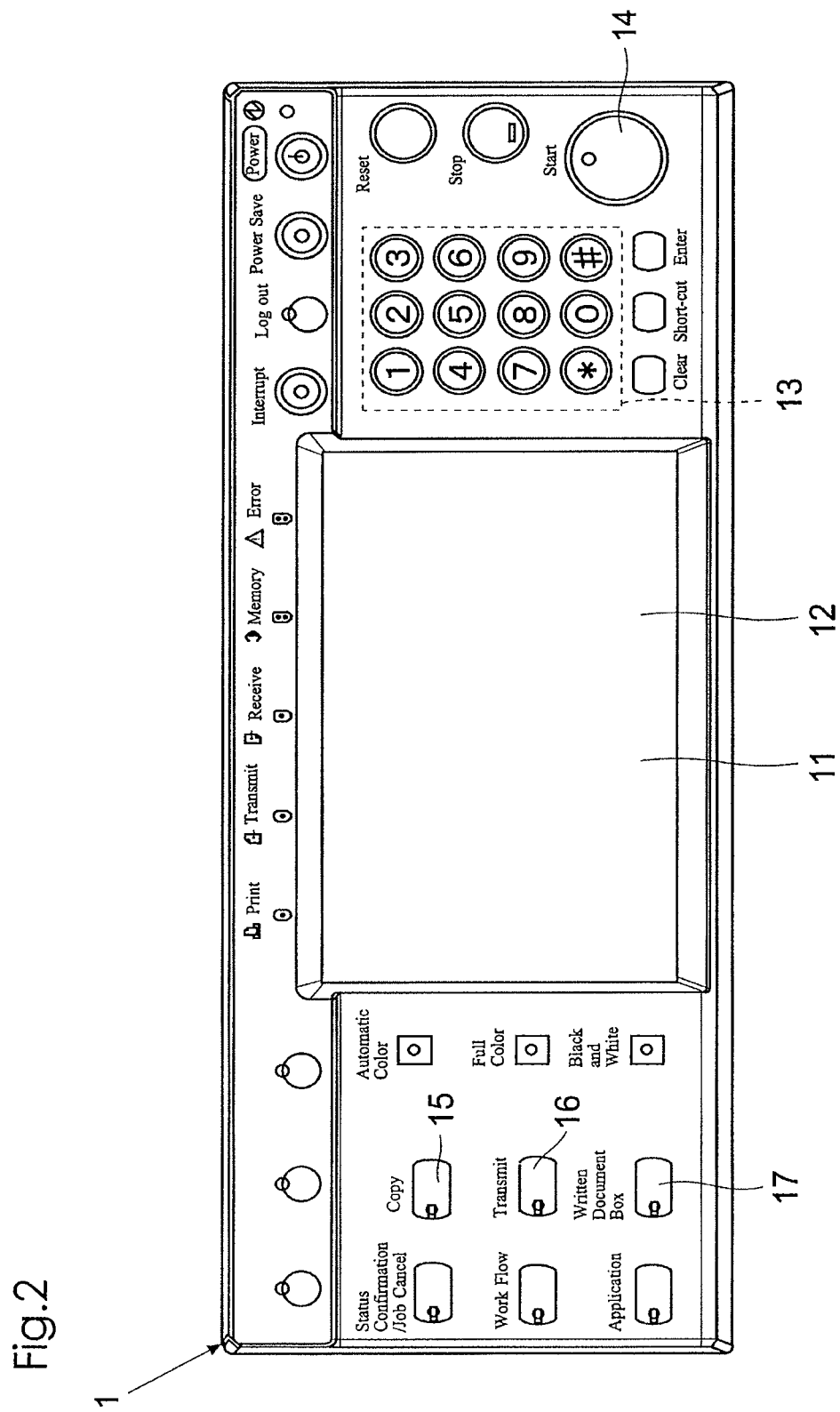
FIG. 2 is a plan view showing one example of an operation panel according to the embodiment.

Next, referring to FIG. 2, one example of the operation panel 1 according to the embodiment of the invention will be described. FIG. 2 is a plan view showing one example of the operation panel 1 according to the embodiment of the invention.

The operation panel 1 (corresponding to the display input device), as shown in FIGS. 1 and 2, is provided at the top of the MFP 100 in elevation view. The operation panel 1 has: a liquid crystal display part 11 (corresponding to a display part) that displays various kinds of images and screens such as: a menu and keys (see FIG. 8, etc.) for making settings and giving operation instructions for the MFP 100; and a status message of, for example, the MFP 100. The user can press the keys displayed at the liquid crystal display part 11 to make the various settings and giving the operation instructions for the MFP 100.

Provided on a top surface of the liquid crystal display part 11 is a touch panel part 12 (corresponding to an input part), which is provided for detecting a position and coordinates of a portion of the liquid crystal display part 11 pressed by the user. Through comparison between the coordinates detected with this touch panel part 12 and positions and coordinates of the various keys shown at the liquid crystal display part 11, the key pressed by the user is identified. As the touch panel part 12, no limitation is provided and thus any type such as a resistive film type, a sound acoustic wave type, an infrared type, or an electrostatic capacitance type can be adopted.

Moreover, the operation panel 1 is provided with keys (buttons) as hard keys, as described below. For example, the operation panel 1 is provided with: a ten key part 13 for numerical input; and a start key 14 for instructions for starting a job such as copying after various settings are made. Also provided are: a copy key 15 pressed upon using a copy function; a transmit key 16 pressed upon using a data transmission function such as a scanner or a Fax; etc. Also provided is a written document box key 17 pressed upon performing, for example, printing or transmission of image data or print data accumulated and stored in the MFP 100. As described above, the touch panel part 12 and the various hard keys are provided at the operation panel 1, and the touch panel part 12 and the various hard keys function as the input parts for making various kinds of settings and mode selection, etc. for the various functions of the MFP 100.

(Hardware Configuration of the MFP 100, etc.)

Figure 3:
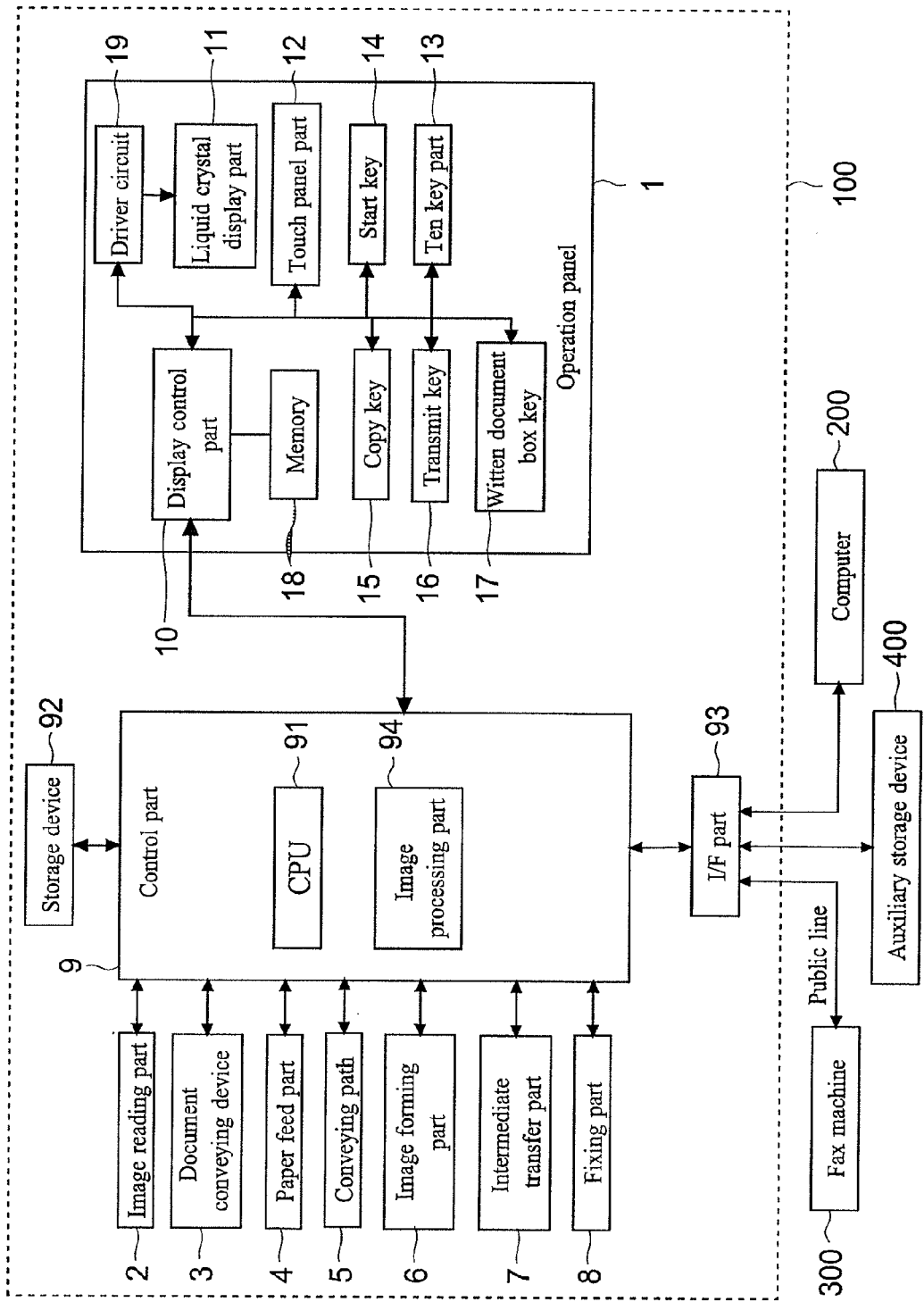
FIG. 3 is a block diagram showing one example of hardware configuration of the MFP according to the embodiment.

Next, referring to FIG. 3, one example of the hardware configuration of the MFP 100 according to the embodiment of the invention will be described. FIG. 3 is a block diagram showing one example of the hardware configuration of the MFP 100 according to the embodiment of the invention.

First, the main body of the MFP 100 will be described. In the main body of the MFP 100, a control part 9 is provided. The control part 9 is connected to, for example, the operation panel 1, the image reading part 2, the document conveying device 3, the paper feed parts 4, the conveying path 5, the image forming part 6, the intermediate transfer part 7, the fixing part 8, etc., and performs control of these parts.

The control part 9 includes elements such as a CPU 91. The CPU 91 performs, for example, computing based on a control program stored in the storage device 92 (corresponding to a storage part) and explored to control the various parts of the MFP 100. The control part 9 may be provided in a plurality of kinds classified on an individual function basis, including, for example, a main control part that performs overall control and image processing and an engine control part that performs, for example, image formation and turning On/Off of a motor rotating different rotors to thereby control printing. In this description, they will be described in a collective mode as one control part.

The storage device 92 is connected to the control part 9. The storage device 92 is composed of a combination of non volatile storage devices 92 such as a ROM, an HDD, etc. and volatile storage devices 92 such as a RAM. The storage device 92 can store various kinds of data such as a control program, control data, setting data, and image data of the MFP 100.

The main body control part 9 is connected to an interface part (hereinafter referred to as I/F part 93) provided with various connectors, a socket, a Fax modem, etc. The I/F part 93 is connected to a plurality of external computers 200 (for example, personal computers) and opposite-side Fax machines 300 (only one each is shown in FIG. 3 for convenience) via a network, a public line, or the like. For example, the I/F part 93 can store the image data obtained at the image reading part 2 into the storage device 92 and transmits it to the external computers 200 and the opposite-side Fax machines 300 (has a scanner function and a Fax function). The I/F part 93 can also, based on image data transmitted from the computers 200 or the opposite-side Fax machines 300 and inputted to the MFP 100, perform printing, Fax transmission, etc. (has a printer function and a Fax function).

The I/F part 93 can also be connected to an auxiliary storage device 400. Note that three I/F circuits for connection to the computers 200, for connection to the Fax machine 300, and for connection to the auxiliary storage device 400 may be separately provided, but only one is illustrated in FIG. 3 for convenience.

The auxiliary storage device 400 is a portable storage device, for example, an USB memory, a compact flash (registered trademark), or the like. The auxiliary storage device 400 is not limited to a semiconductor memory, and thus may be of a magnetic type or a scanning type and no limit is imposed on the auxiliary storage device 400 as long as it has a function as the auxiliary storage device 400. Then the user stores the print data (for example, PDF data or JPEG data) into the auxiliary storage device 400 in the computers 200 or the like. Then with the auxiliary storage device 400 connected to the I/F part 93, based on the print data in the auxiliary storage device 400, printing can be performed.

The control part 9 recognizes inputting performed on the operation panel 1, and controls the MFP 100 in a manner such that, for example, copying is performed in accordance with settings made by the user. For example, when the paper feed part to be used has been set and a setting for copying has been made on the operation panel 1, the control part 9 causes paper feed from the specified paper feed part 4. Moreover, the control part 9 causes the image data to be transmitted from the I/F part 93 to a transmission destination specified on the operation panel 1. Moreover, when a setting for performing printing by using the print data from the connected auxiliary storage device 400 has been made, the control part 9 causes the I/F part 93 to make communication with the auxiliary storage device 400, acquires the print data, and based on the print data, makes the intermediate transfer part 6, etc. to perform the printing.

Moreover, for example, the control part 9 is provided with an image processing part 94 that performs image processing on the image data obtained by reading the document at the image reading part 2 and the image data inputted to the MFP 100 through the I/F part 93. The image data processed by the image processing part 94 is transmitted to, for example, the exposure device 61 to be used for the scanning and exposure of the photoconductive drums, and also transmitted to the I/F part 93 to be transmitted to the outside.

The operation panel 1 of this embodiment has: a display control part 10, a memory 18 (corresponding to a storage part), a driver circuit 19, the liquid crystal display part 11, and the touch panel part 12. The display control part 10 is composed of a CPU, an IC, etc., and controls display of the liquid crystal display part 11 and in response to outputting of the touch panel part 12, identifies the coordinates pressed at the liquid crystal display part 11. Data such as a table showing correspondence between the output of the touch panel part 12 and the coordinates is stored into the memory 18. The display control part 10, for example, through comparison between the coordinates of the pressed position and image data of each setting screen, identifies and recognizes the key (button) selected (pressed) on the setting screen.

Specifically, to select the setting item for each function of the MFP 100 and set a setting value, selection of the key displayed at the liquid crystal display part 11 from a display provided at an uppermost layer in the liquid crystal display part 11 is repeated. Then for each key selection, the display control part 10 switches the display of the liquid crystal display part 11, and the setting value for the function to be selected and set is finally set. The display control part 10 recognizes that the selection and setting of this function has been made, and transmits their details to the control part 9 in the main body. Consequently, the control part 9 makes the various parts such as the image forming part 6 perform operation on which the function selected and set on the operation panel 1 is reflected. Then the user's intention is reflected in printing, transmission, etc. (for example, density setting, zooming out/in, etc.).

Then the image data of the screen and the image displayed by the liquid crystal display part 11 are stored into, for example, the memory 18 in the operation panel 1. Therefore, every time the key on a selection screen for selecting a setting item or each setting screen has been selected, the display control part 10 reads from the memory 18 the image data of the screen to be displayed next.

The image data of the screen and the image displayed by the liquid crystal display part 11 may be stored into, for example, the storage device 92 on the main body side. In this case, the operation panel 1 receives, from the storage device 92 via the control part 9, the image data for providing a display at the liquid crystal display part 11. Upon the reception of this image data, the display control part 10 gives instructions to the driver circuit 19 that actually controls the display of the liquid crystal screen. Note that without providing the operation panel 1 with the display control part 10 and the memory 18, configuration of the control part 9 (the CPU 91 and the storage device 92) may be substituted for functions of the display control part 10 and the memory 18.

(Outline of Written Document Box Screen S1)

Next, referring to FIG. 4, one example of highlighting at the liquid crystal display part 11 according to the embodiment of the invention will be described.

Figure 4:
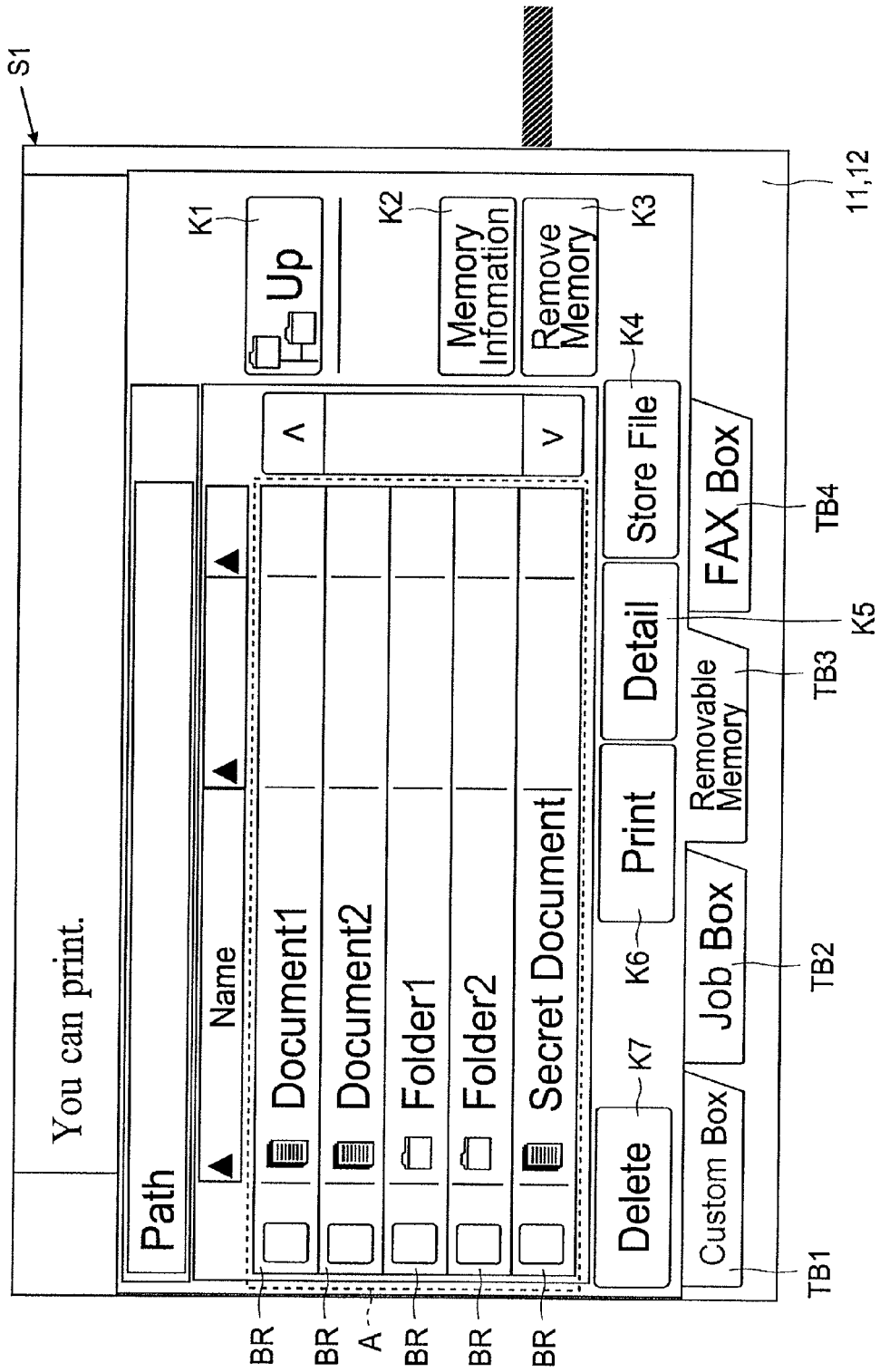
FIG. 4 is an explanatory diagram showing one example of highlighting at a liquid crystal display part according to the embodiment.

First, FIG. 4 shows the written document box screen S1 for handling the print data (for example, PDF, JPEG, or the like) which is stored and accumulated in the storage part (storage device 92 or the memory 18) mounted in the MFP 100 or in the auxiliary storage device 400 connected to the MFP 100 and which includes image data. Here, the outline of the written document box screen S1 will be described.

For example, when a written document box key 17 of the operation panel 1 has been pressed, the display control part 10 makes the liquid crystal display part 11 display the written document box screen S1 as shown in FIG. 4. Arranged on the written document box screen S1 are four tabs including: from the left, a Custom Box tab TB1, a Job Box tab TB2, a Removable Memory tab TB3, and a FAX Box tab TB4. FIG. 4 shows a state in which the Removable Memory tab TB3 has been pressed. Each of the tabs here includes a character string, and is a kind of a character string region having a given region plotted by a solid line.

The Removable Memory tab TB3 is pressed to handle the print data (files) in the auxiliary storage device 400 connected to the I/F part 93. The control part 9, upon receiving from the display control part 10 notification that the Removable Memory tab TB3 has been pressed, makes the I/F part 93 acquire the number of files, file names, etc. in the auxiliary storage device 400 and transfers them to the display control part 10. Then the display control part 10 displays a list of the file names in a list display area A.

The example shown in FIG. 4 shows that the auxiliary storage device 400 includes: three files "Document 1", "Document 2", and "Secret Document"; and two folders "Folder 1" and "Folder 2". Each of the file names and folder names is indicated inside a rectangular bar BR of a horizontally long solid line, and a plurality of bars BR are superposed one on another to be displayed in the list. Here, each bar BR includes a character string and is a character string region plotted by a solid line.

Displayed on the left of the file names and the folder names are icons for discrimination between a file and a folder. The example of FIG. 4 shows one example of a state in which icons indicating a written document are added to the files and icons indicating a folder are added to the folders. Also provided on the left side of each icon is a check box. The display control part 10, upon recognition of the bar BR pressed by the user, makes the liquid crystal display part 11 display a check in the check box. Then any file of the bar BR marked with a check is targeted for various operations.

Notification that the bar BR indicating the folder has been pressed is transmitted from the display control part 10 to the control part 9. Then the control part 9 makes the I/F part 93 acquire from the auxiliary storage device 400 the number of files, the file names, etc. in the pressed folder, and transfers them to the display control part 10. Then the display control part 10 displays in the list display area A a list of the files names in the folder. To return to hierarchy in the auxiliary storage device 400, an Up key K1 arranged on the right of the written document box screen S1 may be pressed.

Arranged around the list display area A are: a plurality of keys for operating the files in the auxiliary storage device 400. Arranged in order from the right of the written document box screen S1 are: a Memory Information key K2, a Remove Memory key K3, a Store File key K4, a Detail key K5, a Print key K6, and a Delete key K7. Here, each of the keys also includes a character string and is a character string region having a given region plotted by a solid line.

The Memory Information key K2 is pressed to view information of the auxiliary storage device 400. For example, the display control part 10, upon recognition that the Memory Information key K2 has been pressed, notifies this to the control part 9. The control part 9 makes the I/F part 93 acquire the information of the auxiliary storage device 400 (for example, a kind, the capacity and the number of stored files of the auxiliary storage device 400). The display control part 10 receives this information from the control part 9 and makes the liquid crystal display part 11 display the information of the auxiliary storage device 400.

The Remove Memory key K3 is pressed to safely remove the auxiliary storage device 400. The display control part 10, upon recognition that the Remove Memory key K3 has been pressed, notifies this to the control part 9. The control part 9 gives the I/F part 93 instructions for putting the auxiliary storage device 400 into a safely removable state. In response to the instructions, the I/F part 93 turns off a power line and a data line to the auxiliary storage device 400, thereby bringing about a state in which the I/F part 93 and the auxiliary storage device 400 are electrically disconnected. Consequently, the auxiliary storage device 400 can be removed without damaging data in the auxiliary storage device 400.

The Store File key K4, the Detail key K5, the Print key K6, and the Delete key K7 are keys for operating the files in the auxiliary storage device 400. The Store File key K4 is pressed to copy the file in the auxiliary storage device 400 into the storage device 92 in the main body. The display control part 10, upon recognition that the Store File key K4 has been pressed, notifies this and the target file (file marked with a check) to the control part 9. For example, the control part 9 gives the I/F part 93 instructions for reading out the target file. In response to the instructions, the I/F part 93 reads out the target file from the auxiliary storage device 400. Then the target file is accumulated into the storage device 92.

The Detail key K5 is pressed to display at the liquid crystal display part 11 details of the file in the auxiliary storage device 400. The display control part 10, upon recognition that the Detail key K5 has been pressed, notifies this and the target file (file marked with a check) to the control part 9. For example, the control part 9 gives the I/F part 93 instructions for acquiring detailed information of the target file. The file usually includes data such as a time stamp (latest creation or update date and time) and a file size. In response to the instructions, the I/F part 93 reads the information such as the time stamp of the target file from the auxiliary storage device 400. Then this information is transferred to the display control part 10, which displays the detailed information of the target file.

The Print key K6 is pressed to print the file in the auxiliary storage device 400. The display control part 10, upon recognition that the Print key K6 has been pressed, notifies this and the target file (file marked with a check) to the control part 9. In response to the notification, the I/F part 93 reads the target file from the auxiliary storage device 400. Then the control part 9, based on the target file, causes printing performed by using the image forming part 6, the image processing part 94, etc.

The Delete key K7 is pressed to delete the file in the auxiliary storage device 400. The display control part 10, upon recognition that the Delete key K7 has been pressed, notifies this and the target file (file marked with a check) to the control part 9. For example, the control part 9 gives the I/F part 93 instructions for deleting the target file. In response to the instructions, the I/F part 93 causes the deletion of the target file from the auxiliary storage device 400.

The case where the Removable Memory tab TB3 has been pressed has been described above. For example, the Custom Box tab TB1 is a tab pressed to handle, for example, the image data stored in the storage device 92 in the main body. The Job Box tab TB2 is a tab pressed to handle the print data transmitted from the external computer 200 and temporarily accumulated in the storage device 92. The FAX Box tab TB4 is a tab pressed to handle data of a Fax transmission and reception job temporarily accumulated in the storage device 92. Whatever tab has been pressed, data such as the stored file is handled for printing, etc.

Thus, whatever tab has been pressed, there is no change in the basic configuration such that bars indicating, for example, files, are displayed in parallel in the list display area A and keys are arranged around the list display area A. For example, when the Custom Box tab TB1 has been pressed, bars BR indicating the files accumulated in the storage device 92 is displayed in the list display area A, and as is the case with when the Removable Memory tab TB3 has been pressed, the Store File key K4, the Detail key K5, the Print key K6, the Delete key K7, etc. may be displayed. In other words, depending on the purpose and usage of the tab, files displayed in the list display area A vary, but arranged keys may be the same whatever tab has been pressed. Note that keys may be displayed in accordance with the purpose of each tab (for example, when the FAX Box tab TB4 has been pressed, a Transmit key is separately arranged).

(Outline of Highlighting of a Fixed Character String Region)

Next, referring to FIGS. 4 and 5, the outline of the highlighting of the fixed character string region such as the key or the tab will be described. This description refers to an example in which a character color is changed for highlighting. FIG. 5 is an explanatory diagram showing one example of word data DI according to the embodiment of the invention.

The liquid crystal display part 11, upon display its screen, displays within the screen character string regions displayed in a fixed manner, such as the constantly displayed keys and tabs. Then in this embodiment, if the adjacent keys or tabs have the same character string and a certain condition is met, of the character strings included in the adjacent keys or tabs, the character strings of non-overlapping portions are highlighted.

Specifically, the display control part 10 checks if there is in the screen any key or tab including a character string included in the word data D1. For example, the word data D1 is data in a table form as shown in FIG. 5. The word data D1 is stored into, for example, the memory 18 in the operation panel 1 (may be stored into the storage device 92).

Further, the display control part 10 checks if the two keys or tabs including the same character string included in the data D1 are adjacent to each other. For example, the display control part 10 determines whether or not they are adjacent to each other, based on whether or not there is any other key or tab therebetween. Note that the display control part 10 may determine whether or not they are adjacent to each other, based on, for example, a distance between end parts of the character string regions. Therefore, the keys or tabs do not have to be necessarily in contact with each other.

For example, the word data D1 shown in FIG. 5 includes character strings such as "Memory" and "Box". For example, referring to the example of FIG. 4, the display control part 10 identifies in the written document box screen S1 presence of the Memory Information key K2 and the Remove Memory key K3 as the keys including the character string "Memory". Moreover, for example, the display control part 10 identifies in the written document box screen S1 presence of the Custom Box tab TB1, the Job Box tab TB2, and FAX Box tab TB4 as the tabs including the character string "Box".

Then the display control part 10, for the character string "Memory", checks if the Memory Information key K2 and the Remove Memory key K3 are adjacent to each other. On the written document box screen S1, the Memory Information key K2 and the Remove Memory key K3 are close to each other in location and there is no key or tab present between the Memory Information key K2 and the Remove Memory key K3. Thus, the display control part 10 judges that they are adjacent to each other, and as shown in FIG. 4, changes a display color of the character strings other than "Memory" in the Memory Information key K2 and the Remove Memory key K3.

For example, if a normal character color is black, the character "Information" for the Memory Information key K2 and the character "Remove" for the Remove Memory key K3 are displayed in a color (for example, red) other than black and a color of key backgrounds. Note that a way of highlighting can be selected, details of which will be described below.

Moreover, the display control part 10, for the character string "Box", checks if the Custom Box tab TB1, the Job Box tab TB2, and the FAX Box tab TB4 are adjacent to each other. On the written document box screen S1, the Custom Box tab TB1 and the Job Box tab TB2 are close to each other in location and there is no key and tab present therebetween. Thus, the display control part 10, as shown in FIG. 4, judges that the Custom Box tab TB1 and the Job Box tab TB2 are adjacent to each other and changes a display color of the character strings other than "Box". A way of highlighting is the same as that of a case of the Memory Information key K2 and the Remove Memory key K3.

On the other hand, on the written document box screen S1, between the Job Box tab TB2 and the FAX Box tab TB4, the Removable Memory tab TB3 is present. Thus, the display control part 10 judges in this case that the FAX Box tab TB4 and the Job Box tab TB2 are not adjacent to each other. Thus, as shown in FIG. 4, the display control part 10 does not cause highlighting of the FAX Box tab TB4. Note that a range for the adjacent relationship can be set, details of which will be described below.

(Key or Tab Predicted Highlighting)

Next, referring to FIGS. 4 and 6, highlighting based on prediction according to the embodiment of the invention will be described. FIG. 6 is an explanatory diagram showing one example of prediction data D2 according to the embodiment of the invention.

The outline of highlighting has been described, referring to FIGS. 4 and 5. However, highlighting all the keys and tabs adjacent to each other may result in too many highlighted sections, which contrarily makes it difficult to view. Thus, with the operation panel 1 of this embodiment, highlighting is performed based on prediction of the next operation to be performed (next key or tab to be pressed).

For the prediction of the next operation to be performed by the user, the prediction data D2 as shown in FIG. 6 is used. The prediction data D2 is previously defined. For example, the prediction data D2 is stored into the memory 18 in the operation panel 1 (may be stored in the storage device 92). The prediction data D2 can include not only data related to the written document box screen S1 but also data related to a different screen.

In the prediction data D2, based on the operation performed by the user, the tabs and keys to be highlighted are defined. For example, for a case where the written document box key 17 has been pressed and the liquid crystal display part 11 has displayed the written document box screen S1 (before any of the tabs is pressed), it is predicted that the user will press the tab he/she desires.

Thus, as shown in FIG. 6, for example, before any of the tabs is pressed after the written document box screen S1 has been called, all the tabs are targeted for highlighting. Therefore, if any of the tabs has not yet been pressed after the written document box key 17 was pressed, as shown in FIG. 4, the Custom Box tab TB1 and the Job Box tab TB2 are highlighted. On the other hand, if the condition is not satisfied (any of the tabs has been pressed), the Custom Box tab TB1 and the Job Box tab TB2 are no longer highlighted.

Moreover, for example, if the auxiliary storage device 400 has been connected to the I/F part 93, it is predicted that the user will eventually remove the auxiliary storage device 400. Moreover, if the auxiliary storage device 400 has been connected to the IN part 93, it is predicted that the user will check the information of the auxiliary storage device 400. Thus, as shown in FIG. 6, for example, in a state in which the auxiliary storage device 400 is connected, the Remove Memory key K3 and the Memory Information key K2 are targeted for highlighting. On the other hand, if the condition is not satisfied, the Remove Memory key K3 and the Memory Information key K2 are not highlighted.

As described above, in this embodiment, highlighting can be performed, targeted on only the character string of the target key or tab in accordance with the condition defined in the prediction data D2. In other words, in this embodiment, predicting the key or tab to be pressed by the user, highlighting can be performed, targeted on only the pressed key or tab. The example described above is just one example, and an even larger number of conditions and target keys, etc. can be included in the prediction data D2.

(Highlighting of Variable Character String Regions)

Next, referring to FIGS. 4 and 5, an outline of the highlighting of the variable character string regions such as file names and folder names will be described. This description also refers to an example in which a character color is changed for highlighting.

The liquid crystal display part 11 displays in the list display area A files and folders stored in the auxiliary storage device 400 or the storage device 92 by superposing the bars BR as the character string regions one on another. Contents of each bar BR varies depending on the auxiliary storage device 400 fitted. Then in this embodiment, if there is the same character string in the adjacent bars BR, the character strings included in the adjacent bars BR but not overlapping with each other is highlighted.

Specifically, the display control part 10, as is the case with the keys or tabs, checks if any of the file names and the folder names displayed in the list display area A agrees with the character string included in the word data D1.

Further, the display control part 10 checks if the two bars BR including the same character string included in the word data D1 are adjacent to each other. An idea of the adjacent relationship may be the same as that of the case of the keys or tabs.

For example, the word data D1 shown in FIG. 5 includes the character strings: "Document", "Folder", etc. For example, referring to the example of FIG. 4, the display control part 10 identifies, as the bars BR including the character string "Document" in the list display area A, the presence of the "Document 1", the "Document 2", and the "Secret Document". Moreover, for example, the display control part 10 identifies, as the bars BR including the character string "Folder" in the list display area A, the presence of the "Folder 1" and the "Folder 2".

Then, the display control part 10, for the confirmed bars BR, checks if they are adjacent to each other. For example, in a state in which the written document box screen S1 of FIG. 4 is displayed, no bar BR is present between the "Document 1" and the "Document 2", but the two bars BR are present between the "Document 2" and the "Secret Document". Thus, the display control part 10, as shown in FIG. 4, changes the display color of the character strings, other than the "Document", included in the "Document 1" and the "Document 2". The same applies to the "Folder 1" and the "Folder 2", and thus the character strings other than the "Folder" are highlighted. A way of highlighting is the same as that of the case of the keys or tabs.

(Limited Highlighting of Variable Character String Region)

Next, referring to FIG. 4, one example of the limited highlighting of the file names and the folder names in the embodiment of the invention will be described.

An outline of the highlighting of the variable character string regions such as the file names and the folder names will be described. However, some of users provide similar file names and folder names, and if they are adjacent to each other, highlighting all the bars BR results in too many highlighted sections, which contrarily makes it difficult to view them. Thus, on the operation panel 1 of this embodiment, limited highlighting can be performed.

To display the file names and the folder names in the list display area A, the display control part 10 acquires via the OF part 93, the control part 9, or the like information of each file and each folder accumulated in the auxiliary storage device 400 or the storage device 92. At this point, the display control part 10 checks a time stamp in the information of each file and each folder, and recognizes, of the files and the folders, the one with latest creation or update date and time.

Then in this embodiment, of the bars BR displayed in the list display area A, only the bar BR corresponding to the file or folder with the latest creation or update date and time is highlighted. In other words, without the latest creation or update date and time, the file names and folder names having the character string included in the word data D1 are not highlighted even if they are adjacent to each other. Consequently, only the file or folder just created and not familiar to the user is highlighted.

Descriptions above and below refer to a case of the character string region corresponding to the file or folder with the latest creation or update date and time. However, the files and the folders created or updated within a given period from the present (for example, from the present back to one month before may be targeted for highlighting.

(Highlighting for Each User)

Figure 7:
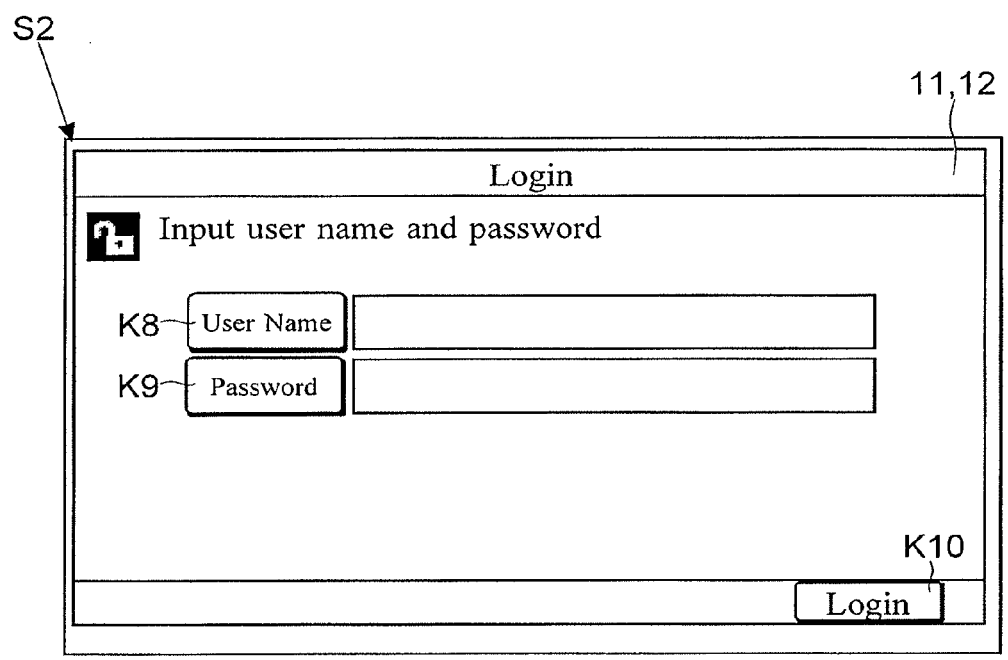
FIG. 7 is an explanatory diagram showing one example of a login screen on the operation panel according to the embodiment.
Figure 8:
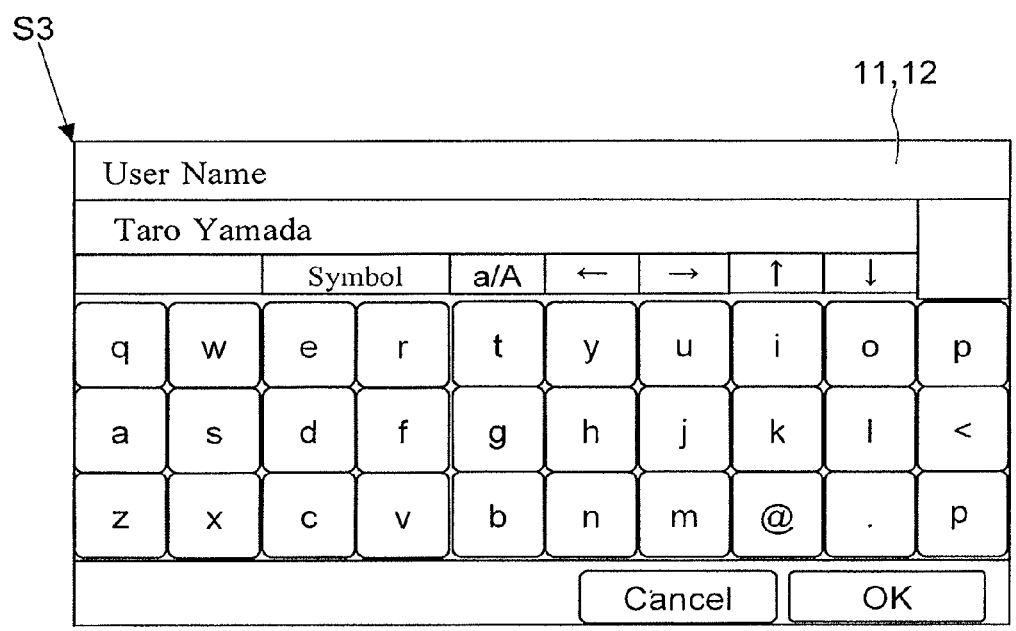
FIG. 8 is an explanatory diagram showing one example of a soft keyboard screen.
Figure 9:
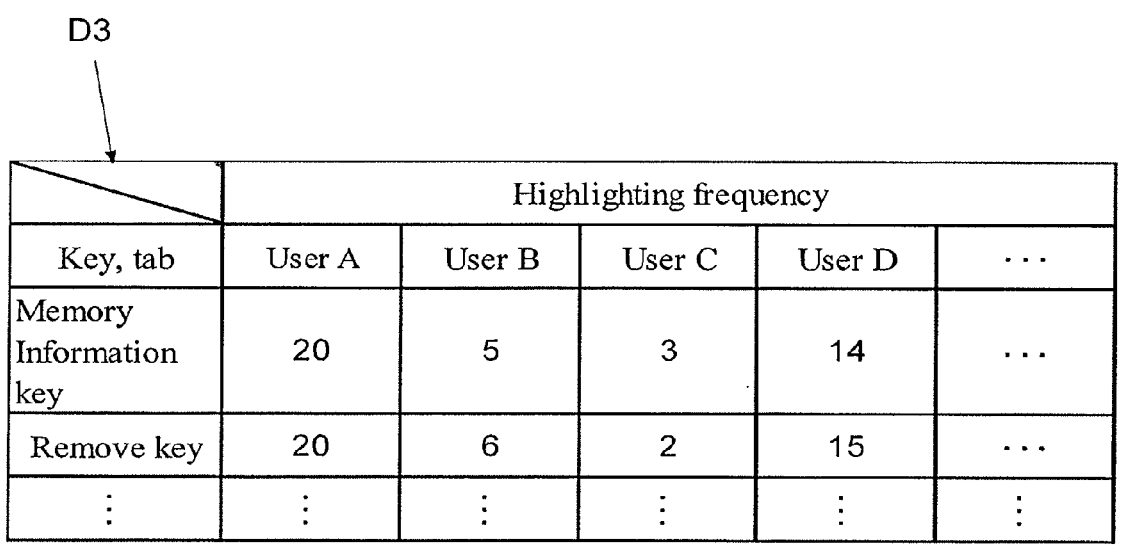
FIG. 9 is an explanatory diagram showing one example of highlighting frequency data according to the embodiment.

Next, referring to FIGS. 7 to 9, one example of the highlighting for each user according to the embodiment of the invention will be described. FIG. 7 is an explanatory diagram showing one example of a login screen S2 on the operation panel 1 according to the embodiment of the invention. FIG. 8 is an explanatory diagram showing one example of a soft keyboard screen S3. FIG. 9 is an explanatory diagram showing one example of a highlighting frequency data D3 according to this embodiment.

In the MFP 100 of this embodiment, users of the MFP 100 can be limited in view of improving information security. In other words, the MFP 100 is provided with a verification function. Thus, for example, a manager can register information related to the user (user information) into the MFP 100 by using the operation panel 1. For example, the storage device 92 and the memory 18 store the user information. Then the user information can include: a name, kana, a login user name, a password, an access level, etc.

First, to provide the MFP 100 with the verification function, the user is required to perform inputting to the login screen S2 as shown in FIG. 7 before using the MFP 100. For example, the liquid crystal display part 11 displays on the login screen S2 a user name key K8 for identifying the user and a password key K9. Then when the user name key K8 or the password key K9 has been pressed, the liquid crystal display part 11 displays the soft keyboard screen S3 as shown in FIG. 8. Then the user inputs the login user name or the password by using the soft keyboard, the ten key part 13, and/or the like.

Then the liquid crystal display part 11 displays, for example, a login key K10 at a lower right end of the login screen S2. When the login key K10 has been pressed, the display control part 10 performs verification processing of checking if any of the user information previously registered into the memory 18 and the storage device 92 agrees with the inputted contents. If there is any agreement and thus the user can be specified, the display control part 10 notifies the control part 9 that the MFP 100 can be used, and the display control part 10 accepts inputting and settings performed and made by the user. Note that the verification processing may be performed by the control part 9, in which case the control part 9 receives the inputted contents from the operation panel 1 to compare them with the user information stored in the memory 18 and the storage device 92.

The example in which inputting to the operation panel 1 is performed has been described as a method of verification, but the user may be provided with for example, an IC card storing identification information, and the MFP 100 may be provided with a card reader (for example, connected to the control part 9) such as an IC card. This permits acquiring the identification information by the card reader to verify and specify the user. Then using the user specification, highlighting can be performed for each user on the operation panel 1 of this embodiment.

Here, as the user makes settings on the operation panel 1, he/she gradually gets familiar with making the settings. Then without performing highlighting, erroneous key or tab pressing decreases in frequency. On the other hand, continuously highlighting to the end of time consequently has the user feel annoying with highlighting.

Thus, on the operation panel 1 of this embodiment, for the character string regions displayed in a fixed manner, such as the keys and the tabs, the frequency in which highlighting has been performed is counted. For example, as shown in FIG. 9, the frequency in which highlighting has been performed is stored as the highlighting frequency data D3 for each user. For example, the highlighting frequency data D3 is stored into the memory 18 in the operation panel 1 (may be stored into the storage device 92).

The display control part 10 stores for each user the accumulated frequency of key or tab highlighting. Then if it has reached certain frequency, the display control part 10 no longer makes the liquid crystal display part 11 highlight this key or tab thereafter. For example, based on an experimental rule that the human being can memorize what he/she has viewed approximately 20 times, the certain frequency is defined as approximately 20 times. How many times of highlighting is required before stopping highlighting can be set, details of which will be described below.

(Various Settings for Highlighting)

Figure 10:
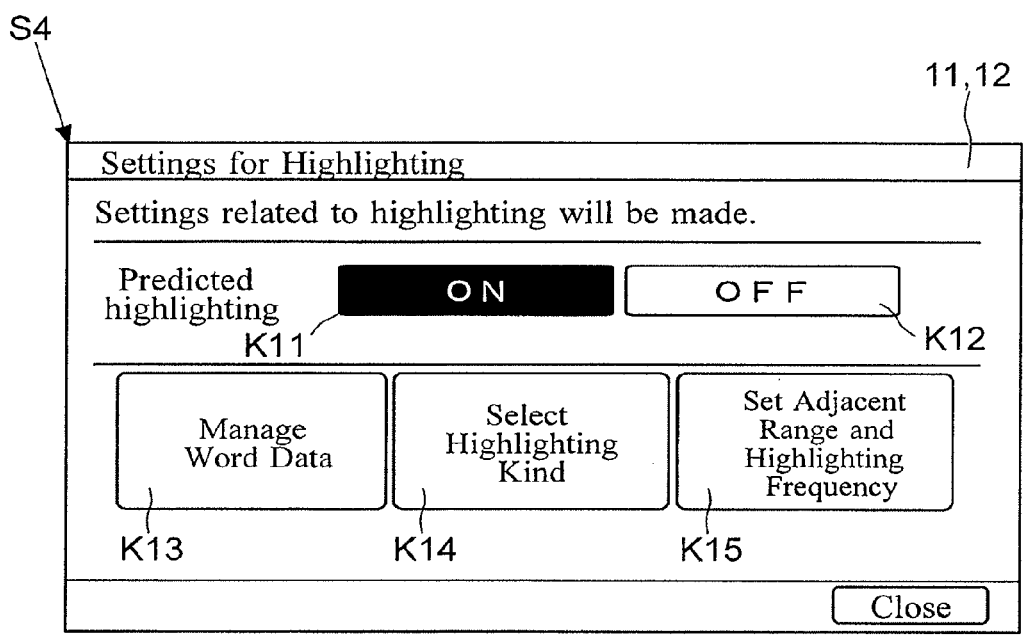
FIG. 10 is an explanatory diagram showing one example of a basic screen for highlighting according to the embodiment.
Figure 11:
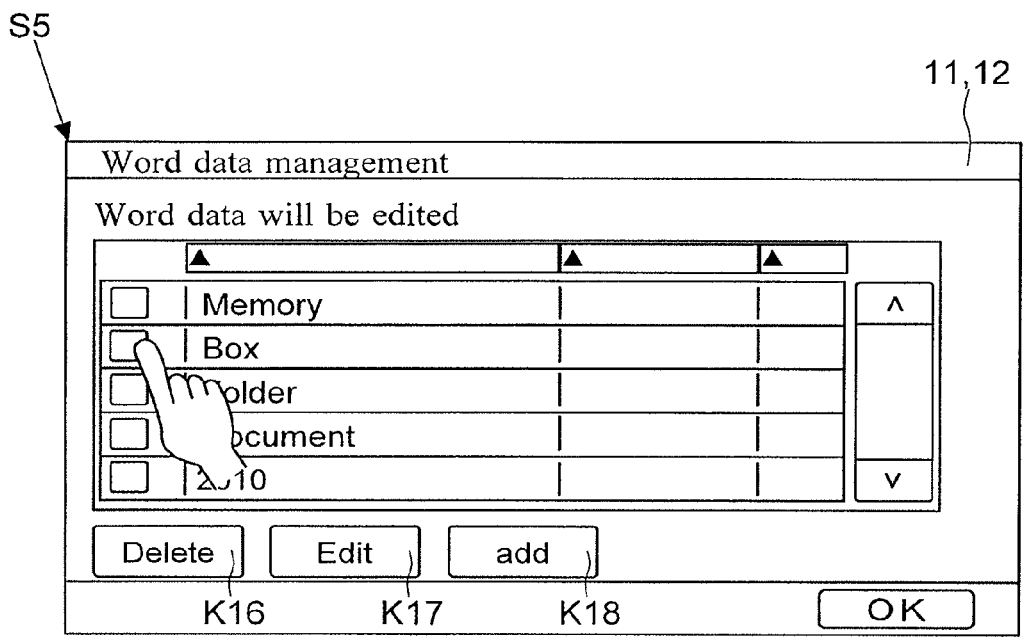
FIG. 11 is an explanatory diagram showing one example of a word data management screen according to the embodiment.
Figure 12:
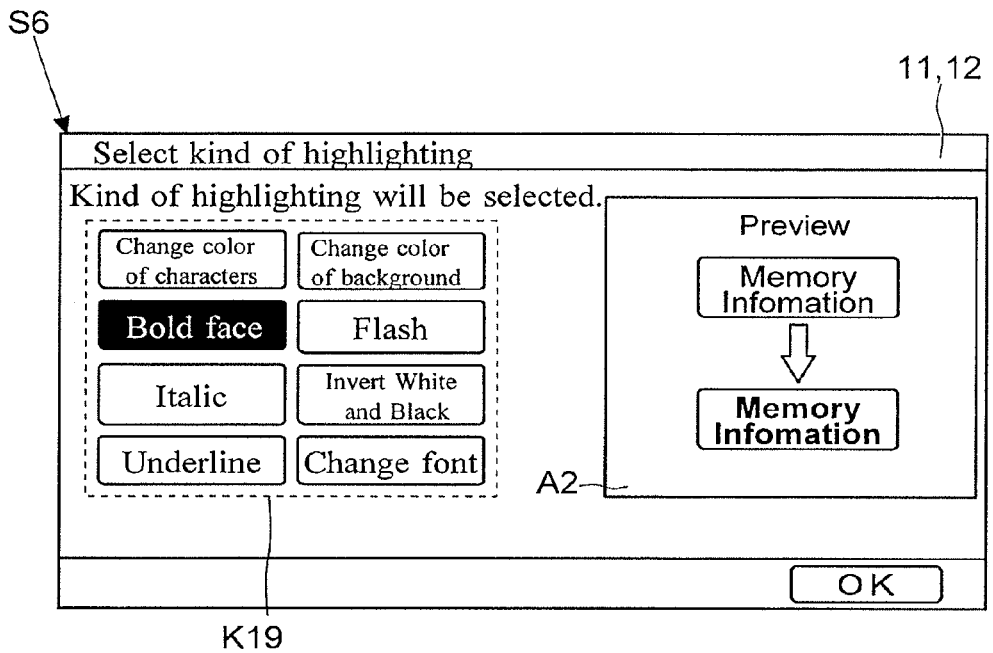
FIG. 12 is an explanatory diagram showing one example of a highlighting kind selection screen according to the embodiment.
Figure 13:
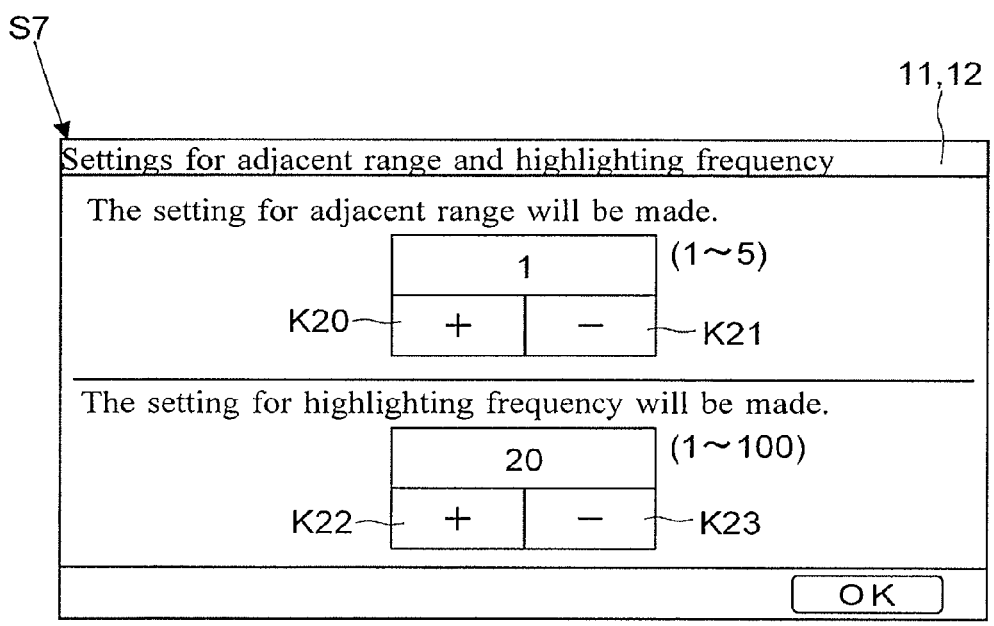
FIG. 13 is an explanatory diagram showing one example of an adjacent range setting screen according to the embodiment.

Next, referring to FIGS. 10 to 13, one example of various settings in highlighting according to the embodiment of the invention will be described. FIG. 10 is an explanatory diagram showing one example of a basic screen S4 for highlighting according to the embodiment of the invention. FIG. 11 is an explanatory diagram showing one example of a word data management screen S5 according to the embodiment of the invention. FIG. 12 is an explanatory diagram showing one example of a highlighting kind selection screen S6 according to the embodiment of the invention. FIG. 13 is an explanatory diagram showing one example of an adjacent range setting screen S7 according to the embodiment of the invention.

First, based on FIG. 10, the basic screen S4 for highlighting will be described. The basic screen S4 shown in FIG. 10 can be reached by, for example, repeated key pressing on the operation panel 1.

(Setting for Predicted Highlighting)

Then on the basic screen S4, in order to permit a setting to be made for whether or not the above-mentioned predicted highlighting is to be performed, a Predicted highlighting ON key K11 and a Predicted highlighting OFF key K12 are arranged. Pressing either of these two keys permits the user to make the setting for whether or not to perform the predicted highlighting by use of the prediction data D2. Then for example, the display control part 10 stores into, for example, the memory 18 that the predicted highlighting is to be performed when the Predicted highlighting ON key K11 has been pressed and that the predicted highlighting is not to be performed when the Predicted Highlighting OFF key K11 has been pressed.

Also arranged on the basic screen S4 are: a Manage Word Data key K13, a Select Highlighting Kind key K14, and an Set Adjacent Range etc. key K15. These keys are arranged for making detailed settings in highlighting.

[Management of Word Data D1]

Next, based on FIG. 11, the management of the word data D1 will be described. The display control part 10, upon recognition that the Manage Word Data key K13 has been pressed on the basic screen S4, makes the liquid crystal display part 11 display the word data management screen S5 shown in FIG. 11.

On the word data management screen S5, a list of the character strings included in the word data D1 are displayed. Then on the left of each character string displayed, a check box is provided. The user can press the touch panel part 12 (liquid crystal display part 11) to put or erase a check.

Then provided on the word data management screen S5 are three kinds of keys for editing the word data D1, including, for example, a Delete key K16, an Edit key K17, and an add key K18. First, the display control part 10, upon recognition that the Delete key K16 has been pressed, makes the character string with a check marked in its check box erase from the word data D1 in the memory 18 or the storage device 92. Consequently, the checked character string is eliminated from the word data D1.

For example, the display control part 10, upon recognition that the Edit key K17 has been pressed, displays the soft keyboard screen S3 as shown in FIG. 8 at the liquid crystal display part 11 so that the character string with a check marked in its check box can be edited and corrected. The user can edit the character string in the word data D1 through inputting to the soft keyboard screen S3. Then the display control part 10 stores edit results into the memory 18 or the storage device 92. Consequently, the display control part 10 thereafter determines whether or not to perform highlighting, based on the updated word data D1.

Moreover, for example, the display control part 10, upon recognition that the add key K18 has been pressed, displays the soft keyboard screen S3 as shown in FIG. 8 at the liquid crystal display part 11 so that a character string can be added to the word data D1. The user inputs on the soft keyboard screen S3 a character string desired to be added. Then the display control part 10 stores into the memory 18 or the storage device 92 the inputted character string to be added. Consequently, the display control part 10 thereafter determines whether or not to perform highlighting, based on the word data D1 to which the new character string has been added.

[Highlighting Kind Selection]

Next, based on FIG. 12, the highlighting kind selection will be described. The display control part 10, upon recognition that the Select Highlighting Kind key K14 has been pressed on the basic screen S4, displays at the liquid crystal display part 11 the highlighting kind selection screen S6 shown in FIG. 12.

On the highlighting kind selection screen S6, selectable kinds of highlighting are displayed as a plurality of keys. The description referring to FIG. 4 refers to the example in which the character color is changed for highlighting, but through inputting onto this highlighting kind selection screen S6, the user can select the kind of highlighting he/she desires.

For example, as shown in FIG. 12, prepared as the kinds of highlighting are: Change Character Color, Bold Face, Italic, Underline, Change Background Color, Flash, Invert White and Black, and Change Font. Thus, displayed in the highlighting kind selection screen S6 is a highlighting kind selection key group K19 for selecting the kind of highlighting. A still different kind of highlighting may be prepared. Through these decorations provided to the character, the display control part 10 can perform highlighting.

Then the display control part 10 stores into the memory 18 or the storage device 92 the kind of highlighting selected by the user. Moreover, the kind of highlighting may be selectable by each user and the memory 18 or the storage device 92 may store the kind of highlighting for each user.

Moreover, provided on the right side of the highlighting kind selection screen S6 is a preview region A2. The display control part 10, in accordance with the selected kind of highlighting, makes the liquid crystal display part 11 perform display of highlighting results as an example. Consequently, the user can select the kind of highlighting while recognizing a mode of highlighting.

[Settings for Adjacent Range and Highlighting Frequency]

Next, based on FIG. 13, the settings for the adjacent range and the highlighting frequency will be described. The display control part 10, upon recognition that the Set Adjacent Range etc. key K15 has been pressed on the basic screen S4, makes the liquid crystal display part 11 display the adjacent range setting screen S7 shown in FIG. 13.

On the adjacent range setting screen S7, a setting for a range in which the character string regions are adjacent to each other and a setting for the frequency in which highlighting has been performed before stopping highlighting can be made.

A default for the adjacent range is set at 1. The above description refers to an example in which the adjacent range is "1". In this case, if there is a different key or tab between keys or tabs including the same character string, highlighting is not performed. In other words, "1" in this description means that "keys or tabs next to each other are treated as being adjacent to each other".

However, some users may desire highlighting even for the keys or tabs a little separated from each other in location. Thus, on the adjacent range setting screen S7, the adjacent range can be set. For example, pressing a plus key K20 in an adjacent range setting region can widen the adjacent range, and pressing a minus key K21 can narrow down the adjacent range.

For example, when "2" has been set for the adjacent range, the display control part 10 treats the keys or the tabs including the same character string as being adjacent to each other even if there is any other key or tab present therebetween. In other words, "2" in this description means that "even the key or the tab and the key or the tab second next thereto are treated as being adjacent to each other. As described above, in this embodiment, the user can set the adjacent range, making it likely or less likely to perform highlighting.

Then the display control part 10 stores into the memory 18 or the storage device 92 a value of the adjacent range set by the user. Moreover, the memory 18 or the storage device 92 may store a value of the adjacent range for each user. The display control part 10, in accordance with the set adjacent range, judges whether or not, for example, the keys or the tabs including the same character string are adjacent to each other.

On the adjacent range setting screen S7, the setting for the range in which the character string regions are adjacent to each other and the setting for the frequency in which highlighting has been performed before stopping highlighting can be made.

Moreover, the frequency of highlighting is set at, for example, 20 times as a default. In other words, if highlighting has been performed 20 times on the key or the tab, the highlighting of this key or tab is no longer performed thereafter.

However, the frequency of highlighting is not necessarily 20 times, and some users require less and some users thinks 20 times is not enough and thus desire to increase the frequency of highlighting. Thus, on the adjacent range setting screen S7, the frequency of highlighting can be set together with the adjacent range. For example, pressing a plus key K22 in a highlighting frequency setting region can increase the frequency, and pressing a minus key K23 can decrease the frequency.

Then the display control part 10 stores into the memory 18 or the storage device 92 a value of the frequency of highlighting set by the user. Moreover, the memory 18 or the storage device 92 may store a value of the frequency of highlighting for each user. The display control part 10, when the set frequency of highlighting has been reached, does not make the liquid crystal display part 11 highlight the key or the tab.

(Highlighting Control)

Figure 14:
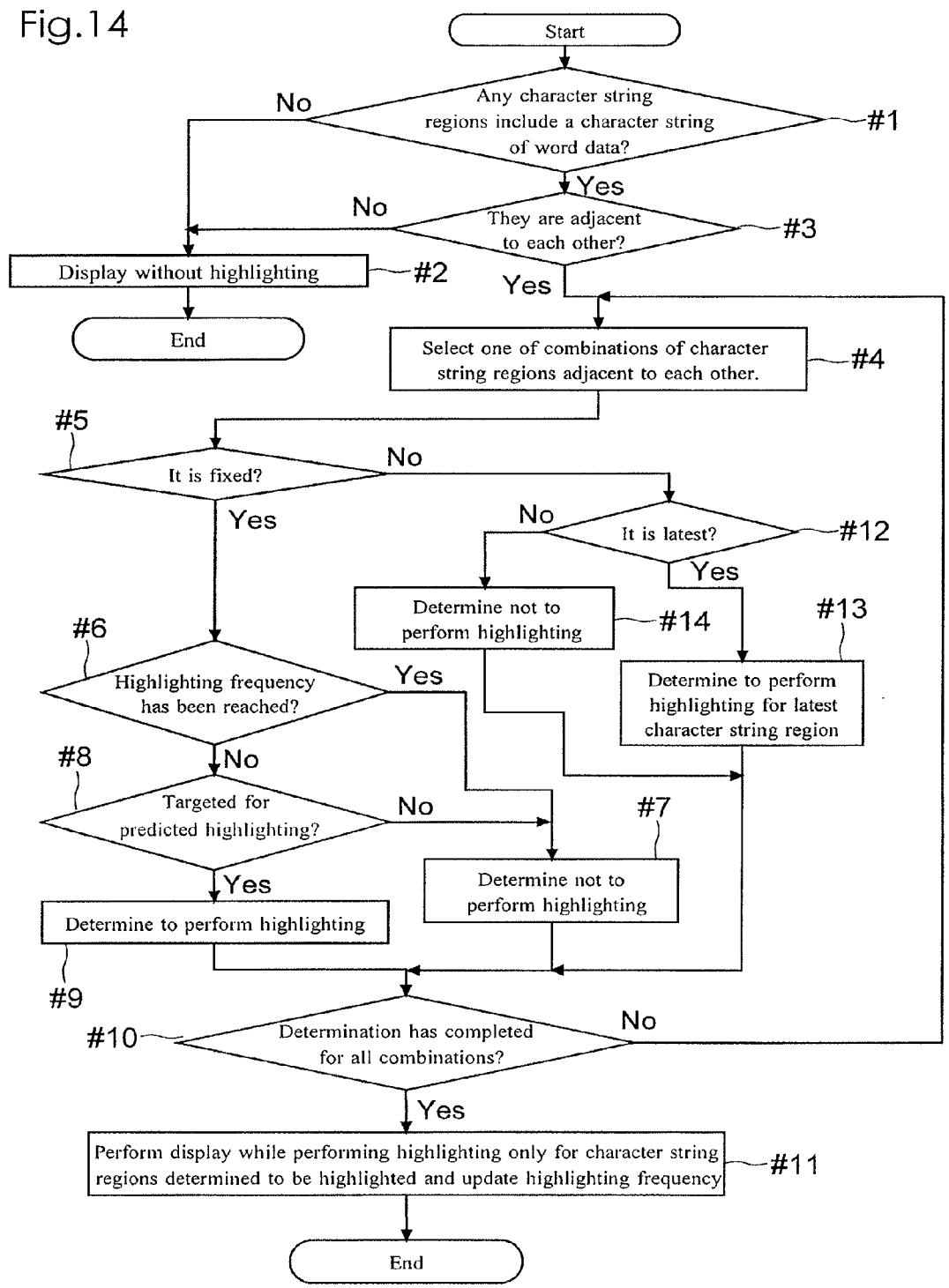
FIG. 14 is a flowchart showing one example of highlighting control according to the embodiment.

Next, based on FIG. 14, one example of the highlighting control on the operation panel 1 according to the embodiment of the invention will be described. FIG. 14 is a flow chart showing one example of the highlighting control on the operation panel 1 according to the embodiment of the invention. For example, the flow chart shown in FIG. 14 is performed every time the display of the liquid crystal display part 11 has been switched by, for example, pressing any of the various keys and/or tabs. This description refers to an example in which predicted highlighting is performed.

Thus, start of FIG. 14 corresponds to a time point at which inputting that requires switching of the display of the liquid crystal display part 11, such as screen switching, has been performed on the operation panel 1 or the like. Next, the display control part 10, with reference to, for example, image data of a screen displayed at the liquid crystal display part 11, checks if there is any character string region including the character string in the word data D1 (step #1). If there is none (No in step #1), the display control part 10 makes the liquid crystal display part 11 perform display without highlighting (step #2). Then the display is performed continuously until display switching is required (step S2→End).

On the other hand, if there is any character string region including the character string in the word data D1 (Yes in step #1), the display control part 10 checks if there is a combination of character string regions which include the same character string in the word data D1 and which are adjacent to each other (step #3). If there is no combination of character string regions adjacent to each other (No in step #3), the control proceeds to step #2. The judgment on whether or not the character string regions are adjacent to each other is made in accordance with the kind of highlighting selected in accordance with the adjacent range set by the user.

On the other hand, if there is any combination of character string regions adjacent to each other (Yes in step #3), the display control part 10 selects, from among combinations of adjacent character string regions, one combination for which whether or not to perform highlighting has not yet been determined (step #4).

Then the display control part 10 checks if the character string regions in the selected one combination are not those, such as the file names or the folder names of the auxiliary storage device 400, whose included character strings vary in some cases, but are those, such as the keys or the tabs, which are displayed in a fixed manner (step #5). If they are the character string regions displayed in a fixed manner (Yes in step #5), the display control part 10, referring to the highlighting frequency data D3, checks if the frequency in which the character string regions have been highlighted has reached the previously defined frequency of highlighting (step #6).

If the frequency has reached the previously defined frequency of highlighting (Yes in step #6), the display control part 10 determines not to perform highlighting for this combination of the character string regions (step #7). On the other hand, if the frequency has not yet reached the previously defined frequency of highlighting (No in step #6), the display control part 10 checks if they are the keys targeted for highlighting in accordance with the condition defined in the prediction data D2 (step #8).

If they are not the character string regions targeted for highlighting in performing predicted highlighting (No in step #8), the control proceeds to step #7. On the other hand, if they are the character string regions targeted for highlighting (Yes in step #8), the display control part 10 determines to perform highlighting for this combination of the character string regions (step #9).

After steps #7 and #9, the display control part 10, for all the combinations, checks if whether or not to perform highlighting has been determined (step #10). If whether or not to perform highlighting has been determined for all the combinations (Yes in step #10), the display control part 10 makes the liquid crystal display part 11 perform display while performing highlighting for only the character string regions for which highlighting has been determined to be performed (step #11). At this point, highlighting is performed in accordance with the kind of highlighting selected by the user. Moreover, for the highlighted key or the like, the highlighting frequency data D3 is updated (step #11, +once for the highlighted key). Then the display is continued until display switching is required (step #11→End). On the other hand, for all the combinations, whether or not to perform highlighting has not yet been determined (No in step #10), the control returns to step #4.

On the other hand, if the character string regions in the selected one combination are those, such as the file names or the folder names of the auxiliary storage device 400, whose included character strings vary in some cases (No in step #5), the display control part 10 checks the time stamps of the files or the folders, and checks if the variable character string regions included in the combination include, of the files and folders displayed in the list display area A, the one with the latest creation or update date and time (step #12).

If the one with the latest creation or update date and time is included (Yes in step #12), the display control part 10 determines to perform highlighting for the character string region with the latest creation or update date and time (step #13). Then the control proceeds to step #10. On the other hand, if the one with the latest creation or update date and time is not included (No in step #12), the display control part 10 determines not to perform highlighting for this combination of the character string regions (step #14). Then the control proceeds to step #10.

As described above, the display input device (operation panel 1) of the invention has at least: the display part (liquid crystal display part 11) displaying character string regions as regions including a character string; the input part (touch panel part 12, etc.) accepting operation performed on the character string region; the storage parts (memory 18 or storage device 92) storing data including data for an image displayed at the display part; and the display control part 10 controlling the display at the display part. The display control part 10 judges whether or not, of the character string regions displayed at the display part, the adjacent character string regions include the same character string, and if they have the same character string, makes the display part highlight characters other than the same character string. Consequently, highlighting is performed only in a case where false recognition or erroneous pressing by the user is likely to occur, for example, a case where of the character string regions such as the keys or the buttons, the adjacent character string regions includes the same character string. Therefore, in order to avoid the erroneous pressing, etc., highlighting can be performed only for the character string region in great need of highlighting. Moreover, the erroneous pressing and the false recognition by the user can effectively be avoided, resulting in no flood of highlighted sections at the display part (liquid crystal display part 11) within the screen.

Moreover, with the display input device of the invention, it can be judged on an individual word basis whether or not the same character string is included, and highlighting can be performed only in a case where the same word is included.

For one operation and inputting, the next operation and inputting to be performed can be predicted in some cases. For example, when printing based on the data in the memory 18 connected to the device has been completed, it can be predicted that the memory 18 will be removed with high possibility. With the display input device of the invention, by use of the prediction data D2, highlighting can be performed only for the character string region which will be operated and inputted with high possibility, that is, which is in great need of highlighting. Moreover, an effect that the user is guided for the next operation is provided.

Moreover, the display input device of the invention can perform highlighting, focusing on the character string region corresponding to data which has the latest creation or update date and time and with which the user is unfamiliar.

Moreover, through repeated highlighting, the user gradually gets used to it and recognizes and stores a function of the character string region as the key and contents of data. With the display input device of the invention, continuously highlighting that is actually no longer required can be avoided, eliminating the user's discomfort that gives the user a feeling of annoyance. Moreover, highlighting is carried out in accordance with the user, and while effectively avoiding the user's erroneous pressing and false recognition, highlighting is no longer performed when the user gets used to it, thereby avoiding the user's feeling of annoyance.

In the display input device of the invention, the user can perform operation such as addition, editing, deletion, etc. of the word data D1. Therefore, highlighting on which user's intention is reflected can be performed.

In the display input device of the invention, the user can select desired highlighting. Therefore, highlighting on which user's intention is reflected can be performed.

Moreover, in the display input device of the invention, the user can make a setting for widening (narrowing) the adjacent range to thereby make a setting in a direction that increases (or decreases) the frequency of highlighting.

Moreover, providing the display input device of the invention can provide an image forming apparatus capable of effectively avoiding setting mistakes and false recognition.

The embodiment of the invention has been described, but the scope of the invention is not limited to this, and thus various modifications can be made within a range not departing from the spirits of the invention.

What is claimed is:
1. A display input device comprising:
a display part displaying at least character string regions as regions including a character string;
an input part accepting an operation performed on the character string region;
a storage part storing data including data for an image displayed at the display part, word data for judging whether or not the character string region is targeted for highlighting, and predication data defining the character string region to be subjected to the highlighting in accordance with an operation performed by a user, the word data including one or a plurality of words as a character string or character strings and the prediction data defining a condition for the user operation and a character string region associated with the condition and targeted for the highlighting; and
a display control part controlling the display performed at the display part, the display control part judging whether or not, of the character string regions displayed at the display part, adjacent character string regions include the same-word included in the word data, and when the adjacent character string regions include the same-word and the prediction data includes one or both of the adjacent character string regions, making the display part highlight characters other than the same word.

2. The display input device according to claim 1, wherein the display part displays in alignment a plurality of the character string regions indicating data in either of the storage part or a storage device directly or indirectly connected to the display input device; and
wherein the display control part checks a time stamp indicating date and time in and at which the data stored in either of the storage part or the storage device has been created or updated, and for the character string regions corresponding to the data stored in either of the storage part or the storage device, makes the display part perform highlighting only for the character string region which meets a predefined temporal criterion.

3. The display input device according to claim 2, wherein the criterion is a latest one of the data stored in the storage part or the storage device.

4. The display input device according to claim 1, wherein the storage part stores a frequency in which the highlighting has been performed for each of the character string regions; and
wherein the display control part, for the character string region for which the frequency in which the highlighting has been performed exceeds a predefined frequency, does not make the display part perform the highlighting.

5. The display input device according to claim 4, wherein the input part accepts inputting for specifying a user; and
wherein the storage part, for each user, stores the frequency in which the highlighting has been performed for each of the character string regions, 6. The display input device according to claim 1, wherein the input part accepts editorial inputting of the word data; and
wherein the storage part updates the word data in accordance with inputting to the input part.

7. The display input device according to claim 1, wherein the input part accepts inputting for selecting one of a plurality of kinds of highlighting; and
wherein the display part performs the highlighting in the kind of the highlighting selected at the input part.

8. The display input device according to claim 1, wherein the input part accepts inputting for setting an adjacent range of the character string regions; and
wherein the display control part judges whether or not the same character string is included in the adjacent range of the character string regions set at the input part, and makes the display part perform the highlighting.

9. An image forming apparatus including the display input device according to claim 1.

10. A display input device display method comprising the steps of:
displaying at least character string regions as regions including a character string;
accepting an operation performed on the character string region;
judging whether or not, of the character string regions displayed, adjacent character string, regions include a same word included in word data and one or both of the adjacent character string regions are in prediction data, the word data being data for judging whether or not the character string region is targeted for highlighting and including one or a plurality of words as a character string or character strings and the prediction data being data defining the character string region to be subjected to the highlighting in accordance with an operation performed by a user, the prediction data defining a condition for the user operation and a character string region associated with the condition and targeted for the highlighting: and
when the adjacent character string regions include the same-word and one or both of the adjacent character string regions are included in the prediction data, controlling the display to highlight characters other than the same word.

11. The display input device display method according to claim 10, comprising
displaying in alignment a plurality of the character string regions indicating data in either of a storage part provided in the display input device or a storage device directly or indirectly connected to the display input device; and
checking a time stamp indicating date and time in and at which the data stored in either of the storage part or the storage device has been created or updated, and for the character string regions corresponding to the data stored in either of the storage part or the storage device, performing highlighting only for the character string region which meets a predefined temporal criterion.

12. The display input device display method according to claim 10, comprising
storing a frequency in which the highlighting has been performed for each of the character string regions; and
for the character string region for which the frequency in which the highlighting has been performed exceeds a predefined frequency, not performing the highlighting.

13. The display input device display method according to claim 12, comprising
specifying a user; and
for each user, storing a frequency in which the highlighting has been performed for each of the character string regions.

14. The display input device display method according to claim 10, comprising
accepting editorial inputting of the word data; and
updating the word data in accordance with the editorial inputting.

15. The display input device display method according to claim 10, comprising
accepting inputting for selecting one of a plurality of kinds of highlighting; and
performing the highlighting in the kind of the highlighting selected through the inputting for the selection.

16. The display input device display method according to claim 10, comprising
accepting inputting for setting an adjacent range of the character string regions; and
judging whether or not the same character string is included in the set adjacent range of the character string regions, and performing the highlighting.

* * * * *